United States Patent
Seo et al.

(10) Patent No.: US 11,176,424 B2
(45) Date of Patent: Nov. 16, 2021

(54) METHOD AND APPARATUS FOR MEASURING CONFIDENCE

(71) Applicant: SAMSUNG SDS CO., LTD., Seoul (KR)

(72) Inventors: Ji-hyeon Seo, Seoul (KR); Young-rock Oh, Seoul (KR); Jeong-hyung Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 150 days.

(21) Appl. No.: 16/665,993

(22) Filed: Oct. 28, 2019

(65) Prior Publication Data

US 2021/0125006 A1     Apr. 29, 2021

(51) Int. Cl.
| | |
|---|---|
| *G06K 9/62* | (2006.01) |
| *G06N 20/00* | (2019.01) |
| *G06N 5/04* | (2006.01) |
| *G06K 9/46* | (2006.01) |

(52) U.S. Cl.
CPC ............. *G06K 9/6267* (2013.01); *G06K 9/46* (2013.01); *G06N 5/04* (2013.01); *G06N 20/00* (2019.01)

(58) Field of Classification Search
CPC .......... G06K 9/6267; G06K 9/46; G06N 5/04; G06N 20/00

USPC .......................................................... 382/159
See application file for complete search history.

(56) References Cited

U.S. PATENT DOCUMENTS

| | | | | |
|---|---|---|---|---|
| 6,535,851 | B1 * | 3/2003 | Fanty ..................... | G10L 15/04 704/249 |
| 7,292,981 | B2 * | 11/2007 | Kemp .................... | G10L 15/08 704/236 |
| 2007/0185712 | A1 * | 8/2007 | Jeong .................... | G10L 15/01 704/238 |
| 2019/0325259 | A1 * | 10/2019 | Murphy ............... | G06K 9/6259 |
| 2020/0097742 | A1 * | 3/2020 | Ratnesh Kumar ... | G06N 3/0454 |
| 2020/0372632 | A1 * | 11/2020 | Chauhan .............. | G06T 7/0012 |

* cited by examiner

*Primary Examiner* — Juan A Torres
(74) *Attorney, Agent, or Firm* — The PL Law Group, PLLC (57) ABSTRACT

A confidence measurement method according to an embodiment includes additionally training a feature extractor of a classification model trained using training data including a plurality of images, using the training data, such that feature vectors for images labeled with the same class among feature vectors for the plurality of images become closer to each other in an embedding space for the feature extractor, and measuring confidence of a classification result for an input image by the trained classification model using the additionally trained feature extractor.

16 Claims, 9 Drawing Sheets

METHOD AND APPARATUS FOR MEASURING CONFIDENCE

CROSS REFERENCE TO RELATED APPLICATIONS AND CLAIM OF PRIORITY

This application claims the benefit of Korean Patent Application No. 10-2019-0134243 filed on Oct. 28, 2019 in the Korean Intellectual Property Office, the disclosure of which is incorporated herein by reference in its entirety.

TECHNICAL FIELD

Embodiments of the present disclosure relate to a confidence measuring technique.

BACKGROUND ART

Many studies have been conducted on confidence measurement for a deep neural network-based classification model.

Specifically, there is a method of presenting a range of confidence by training a distribution of weights of a trained classification model. For example, there is a method of presenting a range of uncertainty through iterative inference or by training distributions of parameters of a model using a technique such as a Gaussian Process, Bayesian Neural Network, Monte-Carlo Dropout, etc. However, the above-described method has disadvantages in that the amount of computation increases as the number of parameters and the amount of data of the model increase and also in that the time required to measure confidence is very long.

On the other hand, a method of expressing confidence as one value uses in-distribution data intended to be classified and even out-of-distribution data (OOD) intended to be excluded through the model for training to measure the confidence. However, such a method has a limitation in that confidence measurement performance for data which is excluded and not used for training cannot be guaranteed.

SUMMARY

Embodiments of the present disclosure are directed to providing a method and apparatus for measuring the confidence of a classification result of a classification model.

According to an aspect of the present disclosure, there is provided a confidence measurement method including additionally training a feature extractor of a classification model trained using training data including a plurality of images, using the training data, such that feature vectors for images labeled with the same class among feature vectors for the plurality of images become closer to each other in an embedding space for the feature extractor, and measuring confidence of a classification result for an input image by the trained classification model using the additionally trained feature extractor.

The embedding space may be a space to which the feature vectors for the plurality of images extracted by the feature extractor are mapped.

The additionally training may include additionally training the feature extractor based on a metric-learning-based loss function and a cross-entropy-based loss function.

The additionally training may include additionally training the feature extractor such that feature vectors for images labeled with different classes among the feature vectors for the plurality of images become farther from each other in the embedding space.

The additionally training may include additionally training the feature extractor by assigning a weight to a feature vector for an image misclassified by the trained classification model among the feature vectors for the plurality of images.

The measuring may include outputting a class for an object included in the input image using the trained classification model, extracting a feature vector for the input image using the additionally trained feature extractor, mapping the feature vector for the input image to an embedding space for the additionally trained feature extractor, and measuring the confidence of the classification result for the input image by the trained classification model based on a distance between the feature vector for the input image and feature vectors associated with the output class among the feature vectors for the plurality of images and a distance between the feature vector for the input image and a feature vector closest to the feature vector for the input image other than the feature vectors associated with the output class among the feature vectors for the plurality of images in the embedding space for the additionally trained feature extractor.

The measuring may include assigning a weight to the measured confidence when a class corresponding to the input image is not present among output classes of the trained classification model.

The confidence measurement method may further include, after the additionally training, determining one of a plurality of confidence measurement techniques based on confidence of a classification result for each of a plurality of different types of validation data measured using the additionally trained feature extractor, and the measuring may include measuring the confidence of the classification result for the input image by the trained classification model based on the determined confidence measurement technique.

The determining may include measuring the confidence of the classification result for the plurality of pieces of validation data through the plurality of confidence measurement techniques using the additionally trained feature extractor, sorting the plurality of pieces of validation data according to size of the confidence of the classification result for the plurality of pieces of validation data measured by each of the plurality of confidence measurement techniques, and determining one of the plurality of confidence measurement techniques by comparing sort orders of confidence scores of the plurality of confidence measurement techniques based on the types of the plurality of pieces of validation data.

According to another aspect of the present disclosure, there is provided a confidence measurement apparatus including a memory configured to store one or more instructions and one or more processors configured to execute the one or more instructions, wherein the one or more processors configured to: additionally train a feature extractor of a classification model trained using training data including a plurality of images, using the training data, such that feature vectors for images labeled with the same class among feature vectors for the plurality of images become closer to each other in an embedding space for the feature extractor, and measure confidence of a classification result for an input image by the trained classification model using the additionally trained feature extractor.

The embedding space may be a space to which the feature vectors for the plurality of images extracted by the feature extractor are mapped.

The one or more processors may additionally train the feature extractor based on a metric-learning-based loss function and a cross-entropy-based loss function.

The one or more processors may additionally train the feature extractor such that feature vectors for images labeled with different classes among the feature vectors for the plurality of images become farther from each other in the embedding space.

The one or more processors may additionally train the feature extractor by assigning a weight to a feature vector for an image misclassified by the trained classification model among the feature vectors for the plurality of images.

The one or more processors may output a class for an object included in the input image using the trained classification model, extract a feature vector for the input image using the additionally trained feature extractor, map the feature vector for the input image to an embedding space for the additionally trained feature extractor, and measure the confidence of the classification result for the input image by the trained classification model based on a distance between the feature vector for the input image and feature vectors associated with the output class among the feature vectors for the plurality of images and a distance between the feature vector for the input image and a feature vector closest to the feature vector for the input image other than the feature vectors associated with the output class among the feature vectors for the plurality of images in the embedding space for the additionally trained feature extractor.

The one or more processors may assign a weight to the measured confidence when a class corresponding to the input image is not present among output classes of the trained classification model.

The one or more processors may determine one of a plurality of confidence measurement techniques based on confidence of a classification result for each of a plurality of different types of validation data measured using the additionally trained feature extractor and may measure the confidence of the classification result for the input image by the trained classification model based on the determined confidence measurement technique.

The one or more processors may measure the confidence of the classification result for the plurality of pieces of validation data through the plurality of confidence measurement techniques using the additionally trained feature extractor, sort the plurality of pieces of validation data according to size of the confidence of the classification result for the plurality of pieces of validation data measured by each of the plurality of confidence measurement techniques, and determine one of the plurality of confidence measurement techniques by comparing sort orders of confidence scores of the plurality of confidence measurement techniques based on the types of the plurality of pieces of validation data.

According to the disclosed embodiments, by additionally training a feature extractor such that feature vectors for images labeled with the same class among feature vectors for a plurality of images included in training data become closer to each other in an embedding space, the feature vectors may be clearly classified for each class in an embedding space for the additionally trained feature extractor. Accordingly, by measuring the confidence of the classification result by the trained classification model using the additionally trained feature extractor, it is possible to improve the accuracy of a confidence measurement method.

Also, according to disclosed embodiments, since confidence is measured using the feature extractor and the training data used in training the classification model, it is possible to be applied to various deep-neural-network-based classification models in a plug-in form.

Also, according to disclosed embodiments, by additionally training the feature extractor by assigning a weight to a feature vector for data misclassified by the classification model among feature vectors for the training data, it is possible to lower the confidence of the misclassified data.

Also, according to the disclosed embodiments, by measuring confidence based on a distance between the feature vector for the input image and a feature vector associated with a class output by the trained classification model in an embedding space for the additionally trained feature extractor, it is possible to measure accurate confidence of even a classification result for out-of-distribution data (OOD) to be excluded as well as a classification result for in-distribution data.

DETAILED DESCRIPTION

Hereinafter, exemplary embodiments will be described with reference to the accompanying drawings. The following detailed description is provided to assist the reader in gaining a comprehensive understanding of methods, apparatuses, and/or systems described herein. However, this is merely an example, and the present disclosure is not limited thereto.

In describing the embodiments, when it is determined that a detailed description of a relevant known technique would unnecessarily obscure the subject matter of the present disclosure, the detailed description will be omitted. Also, terms used herein are defined in consideration of functions and may be changed depending on a user, the intent of an operator, or a custom. Therefore, the definitions should be made based on the contents throughout the specification. The terminology used herein is only for the purpose of describing embodiments and should not be limiting. The singular forms "a," "an," and "the" are intended to include the plural forms as well, unless the context clearly indicates otherwise. Also, it should be understood that the terms "comprises," "comprising," "includes" and/or "including" specify the presence of stated features, integers, steps, operations, elements, components, and/or groups thereof when used herein but do not preclude the presence or addition of one or more other features, integers, steps, operations, elements, components, and/or groups thereof.

A neural network uses artificial neurons with simplified functions of biological neurons, and the artificial neurons may be connected to one another through a connection line having a connection weight. The connection weight, which is a parameter of the neural network, is a specific value of the connection line and may be referred to as a connection strength. The neural network may perform a human cognitive process or training process through artificial neurons. An artificial neuron may also be referred to as a node.

The neural network may include a plurality of layers. For example, the neural network may include an input layer, a hidden layer, and an output layer. The input layer may receive an input for performing training and deliver the input to a hidden layer. The output layer may generate an output of the neural network based on signals received from nodes in the hidden layer. The hidden layer may be located between the input layer and the output layer to change training data transferred through the input layer into a predictable value. Nodes included in the input layer and the hidden layer may be connected to each other through a connection line having a connection weight, and nodes included in the hidden layer and the output layer may be connected to each other through a connection line having a connection weight. Each of the input layer, the hidden layer, and the output layer may include a plurality of nodes.

The neural network may include a plurality of hidden layers. The neural network including the plurality of hidden layers is called a deep neural network, and training a deep neural network is called deep learning. A node included in the hidden layer is called a hidden node. In the following description, it may be understood that training a neural network indicates training parameters of a neural network. Also, the trained neural network may be understood as a neural network to which the trained parameters are applied.

In this case, the neural network may be trained using a preset loss function as an indicator. The loss function may be an indicator for the neural network to determine an optimal weight parameter through training. The neural network may be trained with the goal of minimizing the resulting value of the preset loss function.

The neural network may be trained through supervised learning or unsupervised learning. The supervised learning is a method of inputting training data including an input image and target data corresponding to the input image to a neural network and updating connection weights of connection lines so that the target data corresponding to the input image is output. The unsupervised learning is a method of inputting only an input image, without target data corresponding to the input image, to a neural network as training data and updating connection weights of connection lines so that the features or structure of the input image is ascertained.

Figure 1:
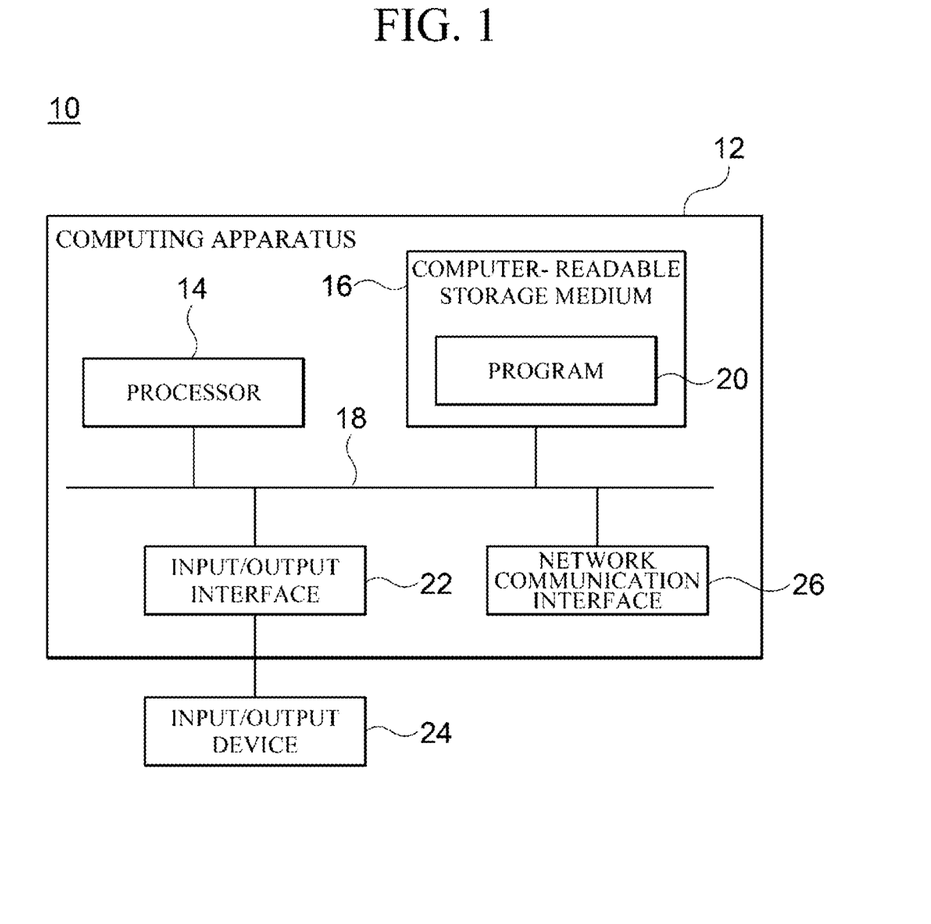
FIG. 1 is a block diagram illustrating an example computing environment including a computing device suitable for use in example embodiments.

FIG. 1 is a block diagram illustrating a computing environment including a computing apparatus suitable for use in example embodiments. In the illustrated embodiment, each component may have a function and capability that differs from those described below, and an additional component may be included in addition to those in the following description.

As shown, a computing environment 10 includes a computing apparatus 12. In an embodiment, the computing apparatus 12 may be a confidence measurement apparatus according to disclosed embodiments.

The computing apparatus 12 includes at least one processor 14, a computer-readable storage medium 16, and a communication bus 18. The processor 14 may enable the computing apparatus 12 to operate according to the aforementioned example embodiment. For example, the processor 14 may execute one or more programs stored in the computer-readable storage medium 16. The one or more programs may include one or more computer-executable instructions which may be configured to enable the computing apparatus 12 to perform operations according to an example embodiment when the operations are executed by the processor 14.

The computer-readable storage medium 16 is configured to store computer-executable instructions, program codes, program data, and/or other suitable forms of information. The program 20 stored in the computer-readable storage medium 16 includes a set of instructions executable by the processor 14. In an embodiment, the computer-readable storage medium 16 may be a memory (a volatile memory such as a random access memory, a non-volatile memory, or an appropriate combination thereof), one or more magnetic disk storage devices, optical disk storage devices, flash memory devices, other forms of storage media that may be accessed by the computing apparatus 12 and are configured to store desired information, or a suitable combination thereof The communication bus 18 connects the processor 14, the computer-readable storage medium 16, and various other components of the computing apparatus 12 to one another.

Also, the computing apparatus 12 may include one or more input/output interfaces 22 for providing an interface for one or more input/output devices 24, and one or more network communication interfaces 26. The input/output interfaces 22 and the network communication interfaces 26 are connected to the communication bus 18. The input/output devices 24 may be connected to other components of the computing apparatus 12 through the input/output interfaces 22. The input/output devices 24 may include input devices such as a pointing device (a mouse, a trackpad, etc.), a keyboard, a touch input device (a touchpad, a touch screen, etc.), a voice or sound input device, various kinds of sensor devices, and/or a capture device and/or may include output devices such as a display device, a printer, a speaker, and/or a network card. The input/output devices 24 may be included in the computing apparatus 12 as components of the computing apparatus 12 and may be connected to the computing apparatus 12 as separate devices distinct from the computing apparatus 12.

Figure 2:
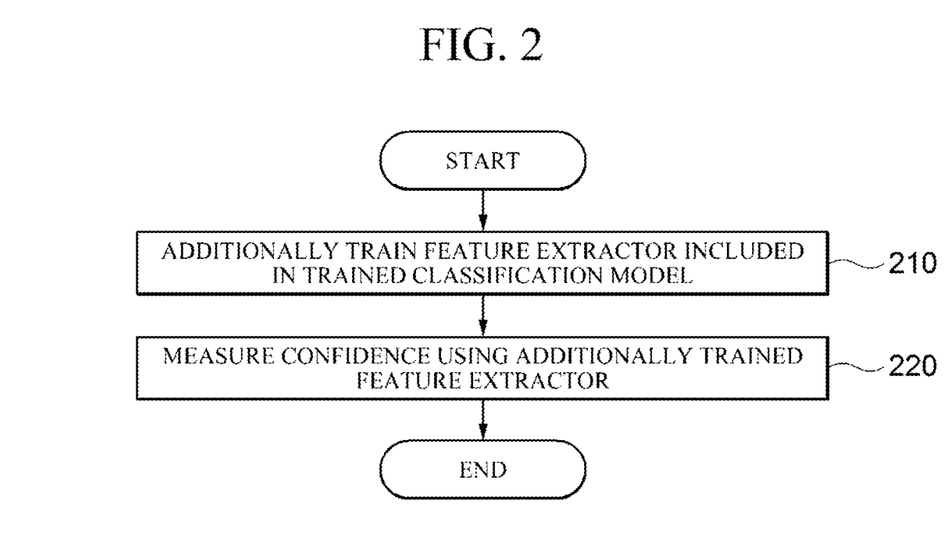
FIG. 2 is a flowchart illustrating a confidence measurement method according to an embodiment.

FIG. 2 is a flowchart illustrating a confidence measurement method according to an embodiment.

The method illustrated in FIG. 2 may be performed by, for example, the computing apparatus 12 including one or more processors and a memory configured to store one or more programs executed by the one or more processors. In the illustrated flowchart, the method will be described as having a plurality of operations. However, at least some of the operations may be performed in a changed order, performed in combination with another operation, omitted, divided into sub-operations and then performed, or performed in addition to one or more operations that are not shown.

Referring to FIG. 2, in operation 210, the computing apparatus 12 uses training data including a plurality of images to additionally train a feature extractor of a classification model trained using the training data such that feature vectors for images labeled with the same class among feature vectors for a plurality of images become closer to each other in an embedding space for the feature extractor.

In this case, the classification model may be a deep-neural-network-based classification model that is set such that one of a plurality of classes is output for an object included in the input image. The trained classification model may be trained using a plurality of images labeled with a specific class.

The feature extractor may include one or more layers for extracting a feature vector for an input image.

The embedding space may be a space to which feature vectors for training data extracted by the feature extractor are mapped. In detail, the embedding space may be a space to which feature vectors for a plurality of images are mapped.

In detail, the computing apparatus 12 may additionally train the trained classification model such that the feature vectors for the plurality of images are clearly classified for each class in the embedding space for the feature extractor. In this case, the computing apparatus 12 may additionally train the trained classification model using the training data that was used in training the trained classification model.

In an embodiment, the computing apparatus 12 may select one layer for generating an embedding space for confidence measurement from among the one or more layers included in the feature extractor. In this case, the computing apparatus 12 may additionally train the feature extractor such that feature vectors for images to which the same class is allocated become closer to each other in an embedding space for the selected layer.

Figure 3A:
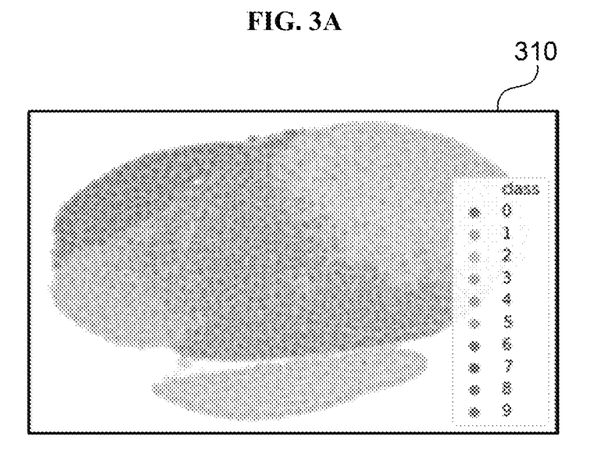
FIGS. 3A and 3B are example diagrams showing an embedding space for each of a low-level layer and a high-level layer included in a feature extractor according to an embodiment.
Figure 3B:
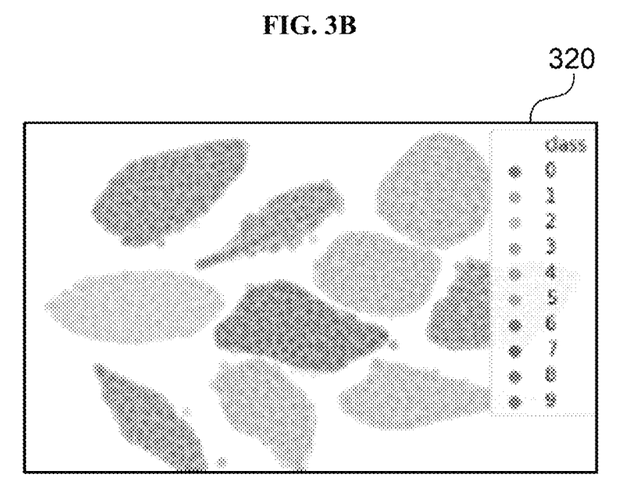

For example, as shown in FIGS. 3A and 3B, it can be seen that feature vectors for training data mapped to an embedding space 320 for a high-level layer may be more definitely classified on a class basis than feature vectors for training data mapped to an embedding space 310 for a low-level layer among the one or more layers included in the feature extractor.

In this case, the computing apparatus 12 may additionally train the feature extractor such that the feature vectors for the plurality of images are optimized in the embedding space for the high-level layer among the one or more layers included in the feature extractor.

In an embodiment, the computing apparatus 12 may additionally train the feature extractor based on a metric-learning-based loss function and a cross-entropy-based loss function.

In detail, the computing apparatus 12 may additionally train the trained classification model including the feature extractor based on the weighted sum of the metric-learning-based loss function and the cross-entropy-based loss function.

In this case, the weighted sum $L_{total}$ of the metric-learning-based loss function and the cross-entropy-based loss function may be represented using Equation 1 below:

$$L_{total}(B, v) = \lambda_1 \times L_{cross\text{-}entropy}(B) + \lambda_2 \times \hat{L}_{metric}(B, v) \quad \text{[Equation 1]}$$

where B is a batch, v is whether the classification result for the batch by the trained classification model is correct, $L_{cross\text{-}entropy}$ is a cross-entropy-based loss function, $\hat{L}_{metric}$ is a metric-learning-based loss function, and $\lambda$ is a weight.

In operation 220, the computing apparatus 12 measures the confidence of a classification result for an input image by the trained classification model using the additionally trained feature extractor.

In detail, the computing apparatus 12 may input an input image to the trained classification model and the additionally trained feature extractor. The computing apparatus 12 may output a class for an object included in the input image using the trained classification model. Also, the computing apparatus 12 may extract a feature vector for the input image using the additionally trained feature extractor. In this case, the computing apparatus 12 may map the feature vector for the input image to an embedding space for the additionally trained feature extractor.

Subsequently, the computing apparatus 12 may measure confidence based on similarity between the feature vector for the input image and feature vectors for a class output from the trained classification model among the feature vectors for the plurality of images in the embedding space for the additionally trained feature extractor.

Also, the computing apparatus 12 may measure confidence based on similarity between the feature vector for the input image and feature vectors for another class different from the class output from the trained classification model among the feature vectors for the plurality of images in the embedding space for the additionally trained feature extractor. In this case, the feature vectors associated with the other class may include feature vectors for a class of a feature vector closest to the feature vector for the input image in addition to the feature vector associated with the class output in the embedding space for the additionally trained feature extractor.

In an embodiment, the computing apparatus 12 may measure the confidence of a classification result for an input image by the trained classification model based on the distance between the feature vector for the input image and the feature vector associated with the output class among the feature vectors for the plurality of images and the distance between the feature vector for the input image and the feature vector closest to the feature vector for the input image other than the feature vector associated with the output class among the feature vectors for the plurality of images in the embedding space for the additionally trained feature extractor.

Figure 4:
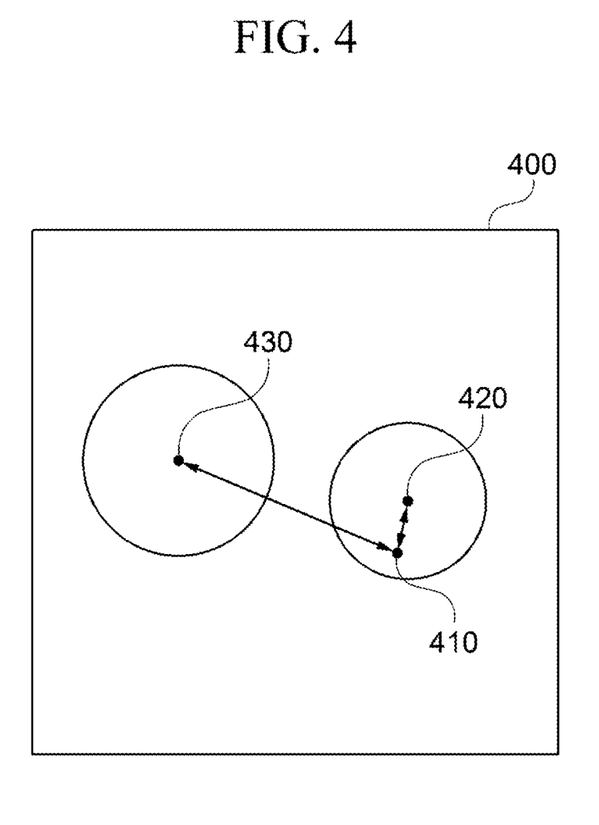
FIG. 4 is a diagram illustrating an example embedding space for an additionally trained feature extractor according to an embodiment.

For example, as shown in FIG. 4, the computing apparatus 12 may measure confidence based on the distance between a feature vector 410 for an input image and a feature vector associated with an output class and the distance between the feature vector 410 for the input image and a feature vector associated with another class different from the output class in an embedding space 400 for the additionally trained feature extractor.

In detail, the computing apparatus 12 may determine a centroid 420 of a feature vector of each image labeled with a class output from the trained classification model in the embedding space 400 for the additionally trained feature extractor. Subsequently, the computing apparatus 12 may calculate the distance between the feature vector 410 for the input image and the centroid 420 of the feature vector associated with the output class. Also, the computing apparatus 12 may determine the centroid 430 of the feature vector for each of the images labeled with the class of the feature vector closest to the feature vector 410 for the input image other than the feature vector associated with the class output from the trained classification model in the embedding space for the additionally trained feature extractor. Subsequently, the computing apparatus 12 may calculate the distance between the feature vector 410 for the input image and the centroid 430 associated with the closest class. Subsequently, the computing apparatus 12 may measure confidence based on the ratio between the distance between the feature vector 410 for the input image and the centroid 420 of the feature vector associated with the output class and the distance between the feature vector 410 for the input image and the centroid 430 associated with the closest class.

In an embodiment, the computing apparatus 12 may assign a weight to the measured confidence when a class corresponding to the input image is not present among output classes of the trained classification model.

In an embodiment, the input image may be one of in-distribution data and out-of-distribution data (OOD).

In this case, the in-distribution data may be data associated with at least one of the plurality of classes set to be output from the trained classification model.

The out-of-distribution data may be data not associated with the plurality of classes set to be output from the trained classification model.

For example, when an input image is the out-of-distribution data, the computing apparatus 12 may assign a weight to the measured confidence such that the measured confidence is lowered. In this case, the assigned weight may be calculated based on the distance between the feature vector associated with the output class and the feature vector for the input image in the embedding space for the additionally trained feature extractor. Thus, the confidence of the classification result of the out-of-distribution data by the trained classification model may be measured to be lower than the confidence of the classification result of the in-distribution data by the trained classification model.

In an embodiment, the computing apparatus 12 may measure the confidence of the classification result for the input image by the trained classification model using the L2 Norm equation. For example, the confidence S of the classification result for the input image by the trained classification model may be represented using Equation 2 below:

$$S(d) = F_1(d) \times F_2(d) \quad \text{[Equation 2]}$$
$$F_1(d) = \frac{\|f(d) - v_{\hat{c}}\|_2}{\|f(d) - v_{\tilde{c}}\|_2}$$
$$\text{where } vc = \frac{1}{|D_c|} \sum_{d_c \in D_c} f(d_c)$$
$$F_2(d) = \frac{1}{(\max(\|f(d) - v_{\hat{c}}\|_2 / \Gamma, 1))^2}$$

where d is an input image, f(d) is a feature vector for an image input in an embedding space for the additionally trained feature extractor, ĉ is a class output from the trained classification model, c̃ is a class of a feature vector closest to the feature vector for the input image other than the output class, $D_c$ are images to which class c is allocated, and Γ is a threshold value.

In detail, when the distance between the feature vector for the input image and the feature vector associated with the output class in the embedding space for the additionally trained feature extractor is less than or equal to a specific threshold value (e.g., Γ in the above Equation 2), the computing apparatus 12 may predict that the input image is in-distribution data. On the other hand, when the distance between the feature vector for the input image and the feature vector associated with the output class in the embedding space for the additionally trained feature extractor is greater than a specific threshold value, the computing apparatus 12 may predict that the input image is out-of-distribution data.

In this case, when the input image is in-distribution data, $F_2$ in the above Equation 2 may be calculated as a value close to one. On the other hand, when the input image is out-of-distribution data, $F_2$ in the above Equation 2 may be calculated as a value close to zero. Accordingly, the confidence of the classification result for the out-of-distribution data by the trained classification model may be measured to be low. Thus, according to the disclosed confidence measurement method, it is possible to measure accurate confidence of the out-of-distribution data as well as for the in-distribution data.

Meanwhile, the above example illustrates that confidence is measured using the L2 Norm equation, but the present disclosure is not limited thereto. For example, $F_1$ and $F_2$ may be configured through various equations other than the L2 Norm equation.

Figure 5:
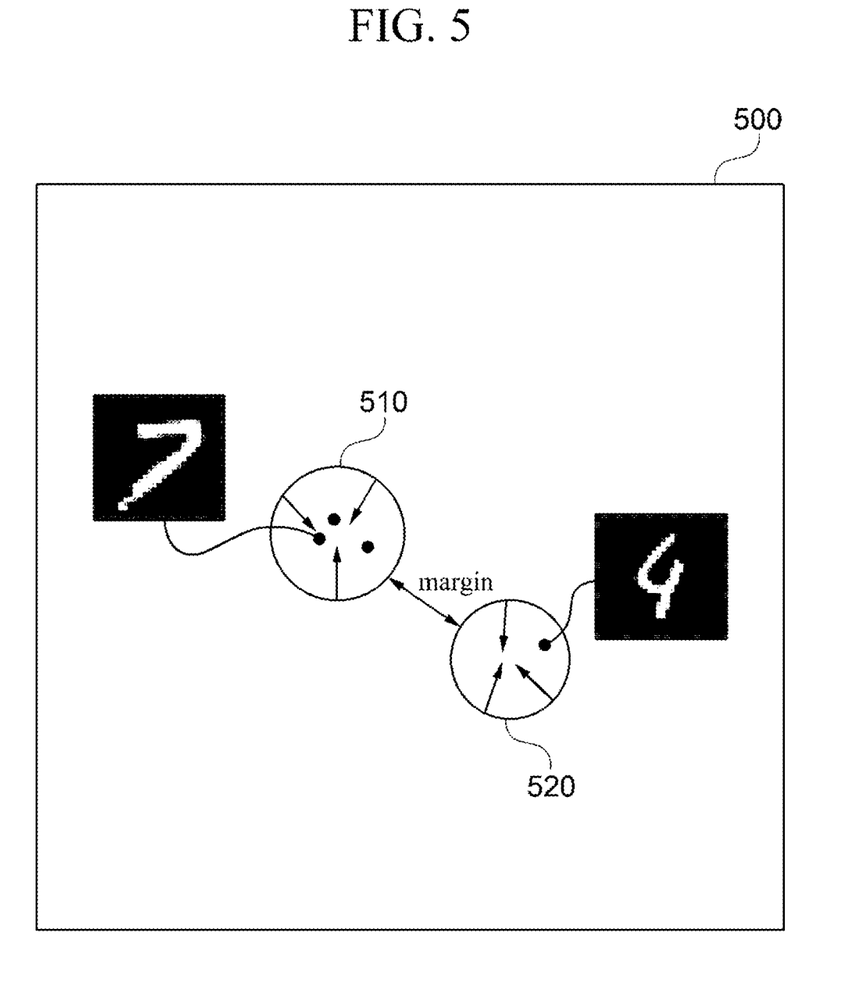
FIGS. 5 and 6 are diagrams illustrating an example in which a feature extractor is additionally trained according to an embodiment.
Figure 6:
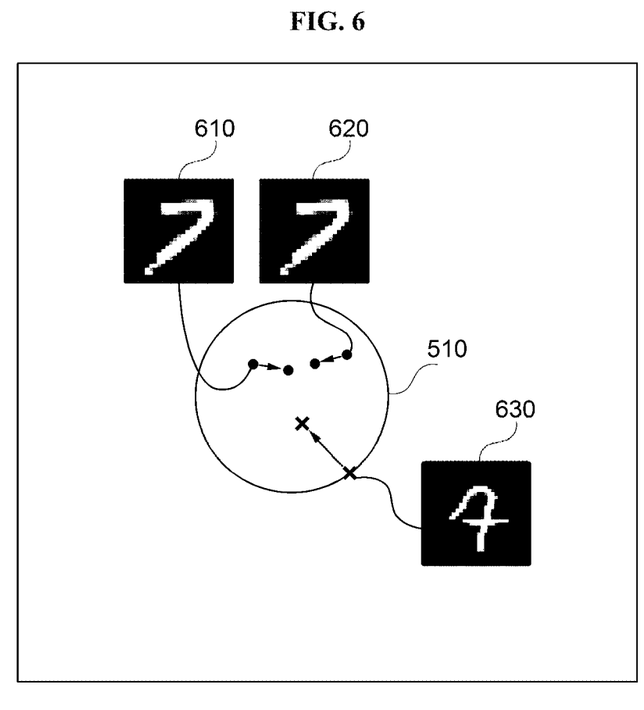

FIGS. 5 and 6 are diagrams illustrating an example in which a feature extractor is additionally trained according to an embodiment.

FIG. 5 assumes that a feature vector 510 for each image labeled with number "7" and a feature vector 520 for each image labeled with number "4" are mapped onto an embedding space 500 for the feature extractor.

Referring to FIG. 5, the computing apparatus 12 may additionally train the feature extractor such that feature vectors for images labeled with the same class become closer to each other in the embedding space 500.

For example, the computing apparatus 12 may additionally train the feature extractor such that the feature vectors 510 for the images labeled with number "7" become closer to each other and the feature vectors 520 for the images labeled with number "4" become closer to each other in the embedding space 500.

Also, in an embodiment, the computing apparatus 12 may additionally train the feature extractor such that feature vectors for images labeled with different classes among feature vectors for a plurality of images become farther from each other in the embedding space 500.

For example, the computing apparatus 12 may additionally train the feature extractor so that the feature vectors 510 for the images labeled with number "7" become far from the feature vectors 520 for the images labeled with number "4" in the embedding space 500. In other words, the computing apparatus 12 may additionally train the feature extractor such that the feature vectors 510 for the images labeled with number "7" are spaced at least a predetermined distance from the feature vectors 520 for the images labeled with number "4" in the embedding space 500.

Also, in an embodiment, the computing apparatus 12 may additionally train the feature extractor by assigning a weight to a feature vector for an image misclassified by the trained classification model among the feature vectors for the plurality of images. In this case, the misclassified image may include an image labeled with a class different from a class output by the trained classification model.

Referring to FIG. 6, it is assumed that a first image 610, a second image 620, and a third image 630 included in training data are labeled with number "7." In this case, it is assumed that the trained classification model outputs number "7" as the classification results for the first image 610 and the second image 620 but outputs number "4" in error as the classification result for the third image 630.

The computing apparatus 12 may additionally train the feature extractor such that feature vectors for the first image 610, the second image 620, and the third image 630 which are assigned with the same class become closer to each other. In this case, since the trained classification model misclassifies the third image 630, the computing apparatus 12 may additionally train the feature extractor by assigning a weight to the feature vector for the third image 630. In this case, the computing apparatus 12 may assign a weight to the misclassified third image 630 such that the movement amount of the feature vector for the third image 630 increases. Accordingly, the movement amount of the feature vector for the third image 630 becoming closer to the feature vectors for the first image 610 and the second image 620 is increased further than the movement amount of the feature vectors for the first image 610 and the second image 620 becoming closer to each other.

Figure 7:
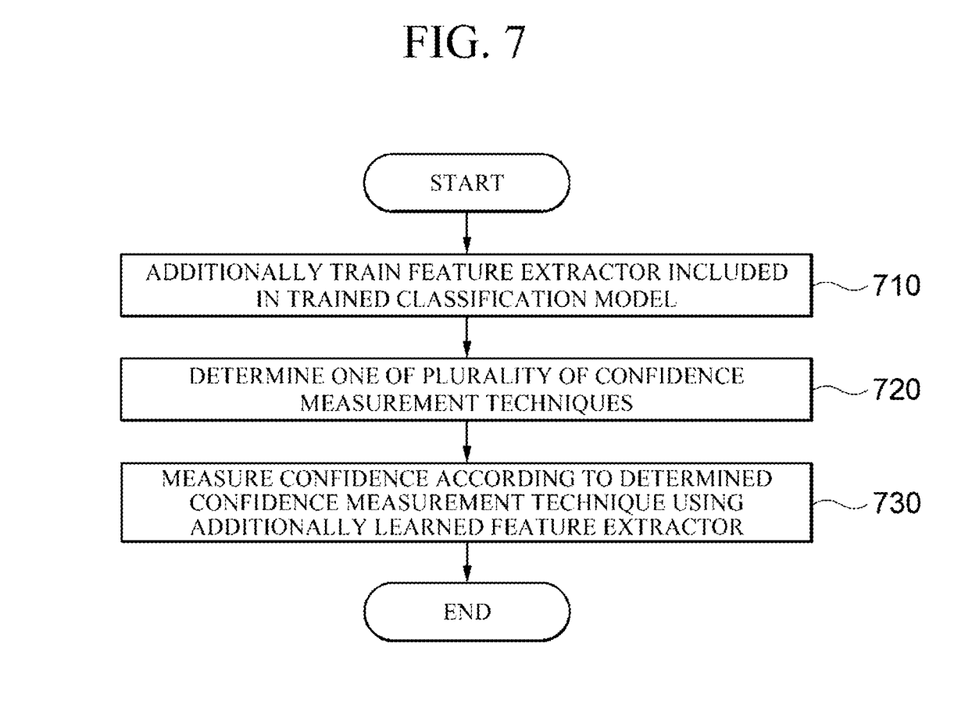
FIG. 7 is a flowchart illustrating a confidence measurement method according to an additional embodiment.

FIG. 7 is a flowchart illustrating a confidence measurement method according to an additional embodiment.

The method illustrated in FIG. 7 may be performed by, for example, the computing apparatus 12 including one or more processors and a memory configured to store one or more programs executed by the one or more processors. In the illustrated flowchart, the method will be described as having a plurality of operations. However, at least some of the operations may be performed in a changed order, performed in combination with another operation, omitted, divided into sub-operations and then performed, or performed in addition to one or more operations that are not shown.

In an example shown in FIG. 7, operation 710 is the same as operation 210 shown in FIG. 2, and thus a detailed description thereof will be omitted.

Referring to FIG. 7, in operation 720, the computing apparatus 12 may determine one of a plurality of confidence measurement techniques based on the confidence of a classification result for each of a plurality of pieces of validation data having different types measured using the additionally trained feature extractor.

In this case, the plurality of pieces of validation data may be different types of data, for example, in-distribution data, out-of-distribution data, novelty data, anomaly data, and the like.

The novelty data, which is a kind of out-of-distribution data, may be data having a feature distribution similar to that of at least one class corresponding to the in-distribution data.

The anomaly data, which is a kind of out-of-distribution data, may be data having a feature distribution completely different from those of classes corresponding to the in-distribution data.

In detail, the computing apparatus 12 may measure the confidence of the classification result for each of the plurality of pieces of validation data through the plurality of confidence measurement techniques using the additionally trained feature extractor.

Also, the computing apparatus 12 may sort the plurality of pieces of validation data according to size of the confidence of the classification results for the plurality of pieces of validation data measured by each of the plurality of confidence measurement techniques.

Also, the computing apparatus 12 may determine one of the plurality of confidence measurement techniques by comparing sort orders of confidence scores of the plurality of confidence measurement techniques based on the types of the plurality of pieces of validation data.

Figure 8:
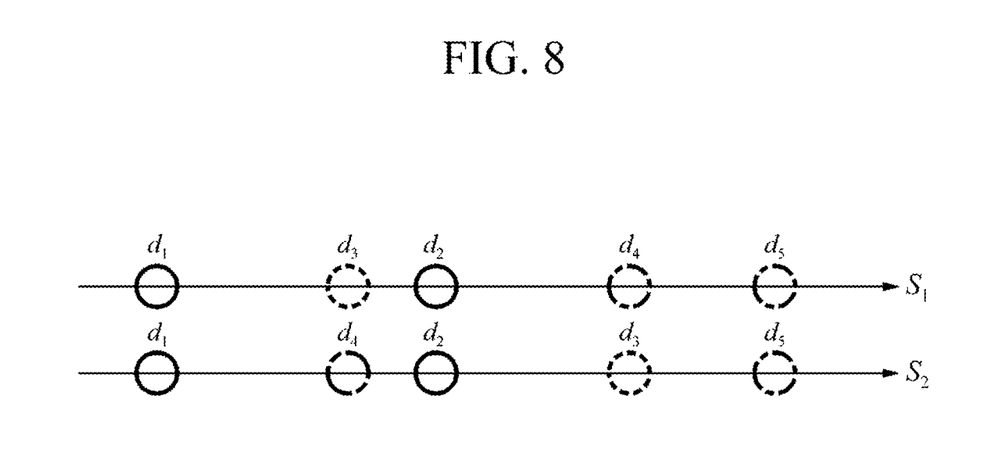
FIGS. 8 and 9 are diagrams illustrating an example in which one of a plurality of confidence measurement techniques is determined according to an embodiment.
Figure 9:
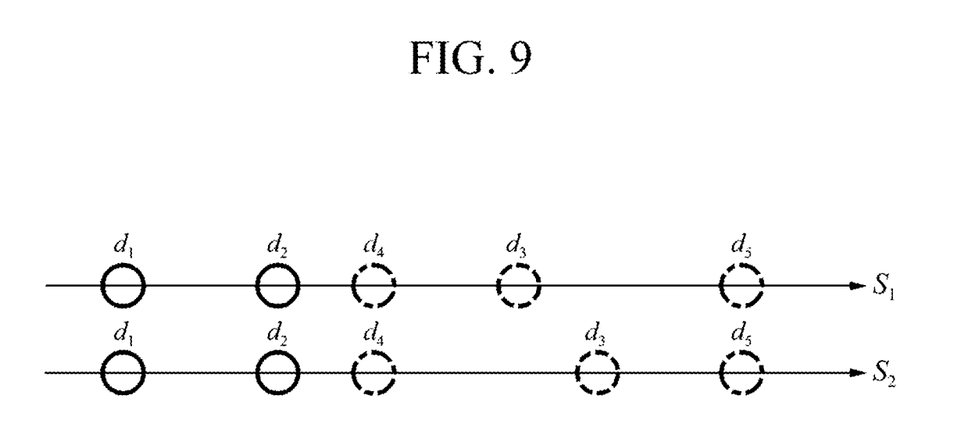

In detail, FIGS. 8 and 9 are diagrams illustrating an example in which one of a plurality of confidence measurement techniques is determined according to an embodiment.

For example, it is assumed that the computing apparatus 12 uses the additionally trained feature extractor to measure the confidence of the classification results for the plurality of pieces of validation data d1 to d5 according to a first confidence measurement technique S1 and a second confidence measurement technique S2. Also, it is assumed that d1 and d2 are out-of-distribution data, d3 is in-distribution data misclassified by the trained classification model, and d4 and d5 are in-distribution data correctly classified by the trained classification model.

Referring to FIG. 8, the computing apparatus 12 may sort the confidence of the classification results for the validation data d1 to d5 measured by the first confidence measurement technique and the second confidence measurement technique sequentially by size.

In an embodiment, the computing apparatus 12 may set an ideal sort order of confidence scores and then compare a sort order of confidence scores of the first confidence measurement technique and a sort order of confidence scores of the second confidence measurement technique to the ideal sort order of confidence scores. In this case, the computing apparatus 12 may select a confidence measurement technique that most closely matches the ideal sort order of confidence scores.

In detail, it is assumed that the ideal sort order of confidence scores is set in the order of out-of-distribution data, misclassified in-distribution data, and accurately classified in-distribution data. In this case, the sort order of confidence scores of the first confidence measurement technique matches the ideal sort order of confidence scores more closely than the sort order of confidence scores of the second confidence technique. Accordingly, the computing apparatus 12 may determine the first confidence measurement technique as a technique for confidence measurement.

Also, referring to FIG. 9, when the sort orders of confidence scores of the plurality of confidence measurement techniques are the same as each other, the computing apparatus 12 may make a determination based on the size of the confidence of the plurality of pieces of validation data.

For example, when the sort order of confidence scores of the first confidence measurement technique is the same as the sort order of confidence scores of the second confidence measurement technique, the size of the confidence of the misclassified data d3 measured by the first confidence measurement technique is higher than the size of the confidence of the misclassified data d3 measured by the second confidence measurement technique. In this case, as the confidence of the misclassified data is measured to be lower, the confidence becomes more accurately measured. Accordingly, the computing apparatus 12 may determine the first confidence measurement technique as a technique for confidence measurement.

In operation 730, the computing apparatus 12 may measure the confidence of a classification result for an input image by the trained classification model based on the determined confidence measurement technique.

The confidence measurement method is the same as that shown in FIG. 2, and thus a detailed description thereof will be omitted.

In the flowcharts illustrated in FIGS. 2 and 7, the methods will be described as having a plurality of operations. However, at least some of the operations may be performed in a changed order, performed in combination with another operation, omitted, divided into sub-operations and then performed, or performed in addition to one or more operations that are not shown.

An embodiment of the present disclosure may include a program for executing the methods described herein on a computer, and a computer-readable recording medium including the program. The computer-readable recording medium may include any one or a combination of a program instruction, a local data file, a local data structure, etc. The medium may be designed and configured specifically for the present disclosure or may be generally available in the field of computer software. Examples of the computer-readable recording medium include magnetic media such as a hard disk, a floppy disk, and a magnetic tape, optical recording media such as a CD-ROM and a DVD, and hardware devices specially configured to store and execute program instructions, such as a ROM, a RAM, and a flash memory. Examples of the program instruction may include a machine code generated by a compiler and a high-level language code that can be executed in a computer using an interpreter.

The technical features have been described with reference to the embodiments. However, the disclosed embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. A confidence measurement method comprising:
additionally training a feature extractor of a classification model trained using training data including a plurality of images, using the training data, such that feature vectors for images labeled with the same class among feature vectors for the plurality of images become closer to each other in an embedding space for the feature extractor; and
measuring confidence of a classification result for an input image by the trained classification model using the additionally trained feature extractor,
wherein the measuring comprises:
outputting a class for an object included in the input image using the trained classification model;
extracting a feature vector for the input image using the additionally trained feature extractor;
mapping the feature vector for the input image to an embedding space for the additionally trained feature extractor; and
measuring the confidence of the classification result for the input image by the trained classification model based on a distance between the feature vector for the input image and feature vectors associated with the output class among the feature vectors for the plurality of images and a distance between the feature vector for the input image and a feature vector closest to the feature vector for the input image other than the feature vectors associated with the output class among the feature vectors for the plurality of images in the embedding space for the additionally trained feature extractor.

2. The confidence measurement method of claim 1, wherein the embedding space is a space to which the feature vectors for the plurality of images extracted by the feature extractor are mapped.

3. The confidence measurement method of claim 1, wherein the additionally training comprises additionally training the feature extractor based on a metric-learning-based loss function and a cross-entropy-based loss function.

4. The confidence measurement method of claim 1, wherein the additionally training comprises additionally training the feature extractor such that feature vectors for images labeled with different classes among the feature vectors for the plurality of images become farther from each other in the embedding space.

5. The confidence measurement method of claim 1, wherein the additionally training comprises additionally training the feature extractor by assigning a weight to a feature vector for an image misclassified by the trained classification model among the feature vectors for the plurality of images.

6. The confidence measurement method of claim 1, wherein the measuring comprises assigning a weight to the measured confidence when a class corresponding to the input image is not present among output classes of the trained classification model.

7. The confidence measurement method of claim 1, further comprising, after the additionally training, determining one of a plurality of confidence measurement techniques based on confidence of a classification result for each of a plurality of different types of validation data measured using the additionally trained feature extractor, wherein the measuring comprises measuring the confidence of the classification result for the input image by the trained classification model based on the determined confidence measurement technique.

8. The confidence measurement method of claim 7, wherein the determining comprises:
measuring the confidence of the classification result for the plurality of pieces of validation data through the plurality of confidence measurement techniques using the additionally trained feature extractor;
sorting the plurality of pieces of validation data according to size of the confidence of the classification result for the plurality of pieces of validation data measured by each of the plurality of confidence measurement techniques; and
determining one of the plurality of confidence measurement techniques by comparing sort orders of confidence scores of the plurality of confidence measurement techniques based on the types of the plurality of pieces of validation data.

9. A confidence measurement apparatus comprising:
a memory configured to store one or more instructions; and
one or more processors configured to execute the one or more instructions,
wherein the one or more processors configured to:
additionally train a feature extractor of a classification model trained using training data including a plurality of images, using the training data, such that feature vectors for images labeled with the same class among feature vectors for the plurality of images become closer to each other in an embedding space for the feature extractor, and measure confidence of a classification result for an input image by the trained classification model using the additionally trained feature extractor,
wherein the one or more processors further configured to:
output a class for an object included in the input image using the trained classification model,
extract a feature vector for the input image using the additionally trained feature extractor,
map the feature vector for the input image to an embedding space for the additionally trained feature extractor, and
measure the confidence of the classification result for the input image by the trained classification model based on a distance between the feature vector for the input image and feature vectors associated with the output class among the feature vectors for the plurality of images and a distance between the feature vector for the input image and a feature vector closest to the feature vector for the input image other than the feature vectors associated with the output class among the feature vectors for the plurality of images in the embedding space for the additionally trained feature extractor.

10. The confidence measurement apparatus of claim 9, wherein the embedding space is a space to which the feature vectors for the plurality of images extracted by the feature extractor are mapped.

11. The confidence measurement apparatus of claim 9, wherein the one or more processors further configured to additionally train the feature extractor based on a metric-learning-based loss function and a cross-entropy-based loss function.

12. The confidence measurement apparatus of claim 9, wherein the one or more processors further configured to additionally train the feature extractor such that feature vectors for images labeled with different classes among the feature vectors for the plurality of images become farther from each other in the embedding space.

13. The confidence measurement apparatus of claim 9, wherein the one or more processors further configured to additionally train the feature extractor by assigning a weight to a feature vector for an image misclassified by the trained classification model among the feature vectors for the plurality of images.

14. The confidence measurement apparatus of claim 9, wherein the one or more processors further configured to assign a weight to the measured confidence when a class corresponding to the input image is not present among output classes of the trained classification model.

15. The confidence measurement apparatus of claim 9, wherein the one or more processors further configured to:
   determine one of a plurality of confidence measurement techniques based on confidence of a classification result for each of a plurality of different types of validation data measured using the additionally trained feature extractor, and
   measure the confidence of the classification result for the input image by the trained classification model based on the determined confidence measurement technique.

16. The confidence measurement apparatus of claim 15, wherein the one or more processors further configured to:
   measure the confidence of the classification result for the plurality of pieces of validation data through the plurality of confidence measurement techniques using the additionally trained feature extractor,
   sort the plurality of pieces of validation data according to size of the confidence of the classification result for the plurality of pieces of validation data measured by each of the plurality of confidence measurement techniques, and
   determine one of the plurality of confidence measurement techniques by comparing confidence sort orders of confidence scores of the plurality of confidence measurement techniques based on the types of the plurality of pieces of validation data.

* * * * *